(12) United States Patent
Sills et al.

(10) Patent No.: US 8,845,944 B2
(45) Date of Patent: *Sep. 30, 2014

(54) METHOD OF MANUFACTURING MIDSOLE FOR ARTICLE OF FOOTWEAR

(75) Inventors: Craig K. Sills, Tigard, OR (US); Hien Cong Le, Hochiminh (VN); Nalinrat Charoonsak, Bangkok (TH)

(73) Assignee: Nike, Inc., Beaverton, OR (US)

( * ) Notice: Subject to any disclaimer, the term of this patent is extended or adjusted under 35 U.S.C. 154(b) by 797 days.

This patent is subject to a terminal disclaimer.

(21) Appl. No.: 12/552,790

(22) Filed: Sep. 2, 2009

(65) Prior Publication Data

US 2011/0047721 A1 Mar. 3, 2011

(51) Int. Cl.
*B29C 45/14* (2006.01)
*B29C 45/16* (2006.01)

(52) U.S. Cl.
USPC .......................................... 264/250; 264/275

(58) Field of Classification Search
None
See application file for complete search history.

(56) References Cited

U.S. PATENT DOCUMENTS

| | | |
|---|---|---|
| 2,410,019 A | 10/1946 | Davis |
| 2,930,149 A | 3/1960 | Hack et al. |
| 2,981,011 A | 4/1961 | Lombardo |
| 3,129,520 A | 4/1964 | Funck |
| 3,295,230 A * | 1/1967 | Szerenyi et al. ............ 36/59 C |
| 3,608,004 A | 9/1971 | Borisuck et al. |
| 4,302,892 A | 12/1981 | Adamik |
| 4,364,188 A | 12/1982 | Turner et al. |
| 4,364,189 A | 12/1982 | Bates |
| 4,398,357 A | 8/1983 | Batra |
| 4,506,462 A | 3/1985 | Cavanagh |
| 4,547,979 A | 10/1985 | Harada et al. |
| 4,551,930 A | 11/1985 | Graham et al. |
| 4,557,060 A | 12/1985 | Kawashima |
| 4,624,061 A | 11/1986 | Wezel et al. |
| 4,642,911 A | 2/1987 | Talarico, II |
| 4,648,923 A * | 3/1987 | Chapnick ..................... 156/82 |
| 4,654,983 A | 4/1987 | Graham et al. |
| 4,667,423 A | 5/1987 | Autry et al. |
| 4,730,402 A | 3/1988 | Norton et al. |
| 4,759,136 A | 7/1988 | Stewart et al. |
| 4,766,679 A | 8/1988 | Bender |
| 4,876,053 A * | 10/1989 | Norton et al. ................ 264/255 |
| 4,956,927 A | 9/1990 | Misevich et al. |
| 5,025,573 A | 6/1991 | Giese et al. |
| 5,141,578 A | 8/1992 | Yang |

(Continued)

FOREIGN PATENT DOCUMENTS

| | | |
|---|---|---|
| DE | 202004016192 U1 | 1/2005 |
| EP | 1352579 A1 | 10/2003 |

*Primary Examiner* — Edmund H. Lee
(74) *Attorney, Agent, or Firm* — Banner & Witcoff, Ltd.

(57) ABSTRACT

A method of forming includes the steps of: placing a first mold member and a second mold member in contact with one another; injecting a first material into a first recess in the first mold member to form a first portion of a midsole while the first mold member is maintained at a temperature below an ambient temperature; removing the first portion of the midsole from the first recess; positioning the first portion of the midsole in the second recess in the third mold member of the second mold assembly; placing a second material into the second recess in contact with the first portion of the midsole; placing the third mold member and the fourth mold member in contact with one another; and subjecting the second material and the first portion in the second mold assembly to heat and pressure to form a midsole.

21 Claims, 6 Drawing Sheets

(56) References Cited

U.S. PATENT DOCUMENTS

| | | | |
|---|---|---|---|
| 5,147,589 A | 9/1992 | Chang et al. | |
| 5,308,420 A | 5/1994 | Yang | |
| 5,318,645 A | 6/1994 | Yang | |
| 5,325,611 A | 7/1994 | Dyer et al. | |
| 5,362,435 A | 11/1994 | Volpe | |
| 5,396,675 A | 3/1995 | Vincent et al. | |
| 5,435,077 A | 7/1995 | Pyle | |
| 5,435,078 A | 7/1995 | Pyle | |
| 5,560,877 A * | 10/1996 | Yung et al. | 264/51 |
| 5,572,805 A | 11/1996 | Giese et al. | |
| 5,575,089 A | 11/1996 | Giese et al. | |
| 5,649,374 A | 7/1997 | Chou | |
| 5,787,610 A | 8/1998 | Brooks | |
| RE35,905 E | 9/1998 | Vincent et al. | |
| 5,921,004 A | 7/1999 | Lyden | |
| 6,023,859 A | 2/2000 | Burke et al. | |
| 6,061,929 A | 5/2000 | Ritter | |
| D426,053 S | 6/2000 | Santa | |
| 6,132,663 A * | 10/2000 | Johnson et al. | 264/250 |
| 6,689,300 B2 | 2/2004 | Chang | |
| 6,748,675 B2 | 6/2004 | Sato | |
| 6,749,781 B1 | 6/2004 | Maurer | |
| 6,951,453 B2 * | 10/2005 | Neter et al. | 425/526 |
| 7,281,343 B2 | 10/2007 | Riha et al. | |
| 7,313,875 B2 | 1/2008 | Morgan | |
| 7,464,428 B2 | 12/2008 | Norton | |
| 8,246,881 B2 * | 8/2012 | Maranan et al. | 264/250 |
| 2001/0008320 A1 * | 7/2001 | Scolamiero | 264/250 |
| 2003/0115776 A1 | 6/2003 | Chu | |
| 2003/0208930 A1 | 11/2003 | Swigart | |
| 2004/0056385 A1 * | 3/2004 | Neter et al. | 264/328.14 |
| 2004/0154188 A1 | 8/2004 | Laska | |
| 2004/0261297 A1 * | 12/2004 | Park | 36/87 |
| 2007/0113425 A1 * | 5/2007 | Wakley et al. | 36/28 |
| 2008/0060228 A1 | 3/2008 | Morgan et al. | |
| 2010/0098797 A1 * | 4/2010 | Davis et al. | 425/129.2 |
| 2010/0122476 A1 * | 5/2010 | Le et al. | 36/30 R |
| 2010/0126040 A1 * | 5/2010 | Grote et al. | 36/28 |
| 2011/0154688 A1 * | 6/2011 | Yu et al. | 36/28 |
| 2011/0283560 A1 * | 11/2011 | Portzline et al. | 36/31 |

* cited by examiner

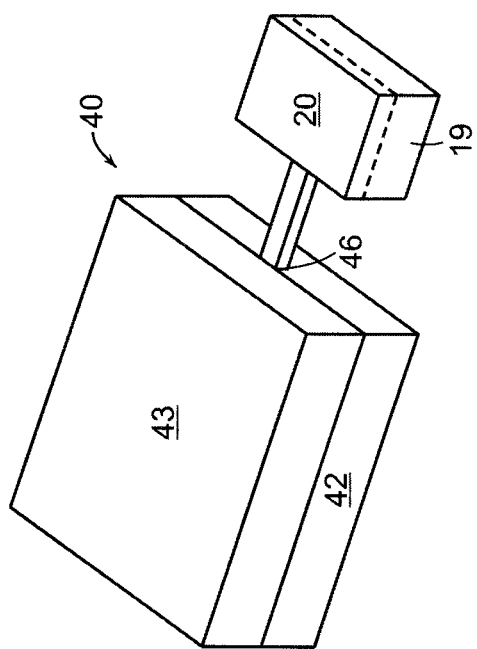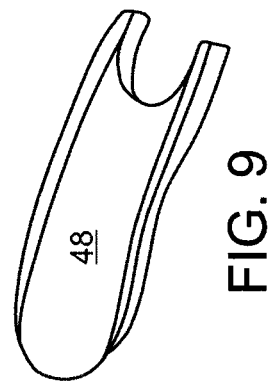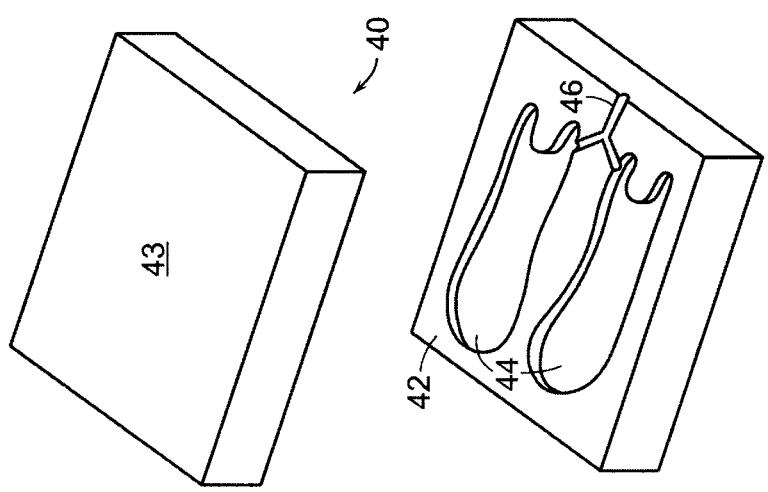

METHOD OF MANUFACTURING MIDSOLE FOR ARTICLE OF FOOTWEAR

FIELD OF THE INVENTION

Aspects of this invention relate generally to a mold assembly for a midsole and a method of manufacture, and, in particular, to a mold assembly for producing a midsole formed of two materials.

BACKGROUND OF THE INVENTION

Conventional articles of athletic footwear include two primary elements, an upper and a sole structure. The upper provides a covering for the foot that comfortably receives and securely positions the foot with respect to the sole structure. In addition, the upper may have a configuration that protects the foot and provides ventilation, thereby cooling the foot and removing perspiration. The sole structure is secured to a lower portion of the upper and is generally positioned between the foot and the ground. In addition to attenuating ground reaction forces, the sole structure may provide traction, control foot motions (e.g., by resisting over pronation), and impart stability, for example. Accordingly, the upper and the sole structure operate cooperatively to provide a comfortable structure that is suited for a wide variety of activities, such as walking and running.

The sole structure generally incorporates multiple layers that are conventionally referred to as an insole, a midsole, and an outsole. The insole is a thin, compressible member located within the upper and adjacent to a plantar (i.e., lower) surface of the foot to enhance footwear comfort. The midsole, which is conventionally secured to the upper along the length of the upper, forms a middle layer of the sole structure and is primarily responsible for attenuating ground reaction forces. The outsole forms the ground-contacting element of footwear and is usually fashioned from a durable, wear-resistant material that includes texturing to improve traction.

The conventional midsole is primarily formed from a resilient, polymer foam material, such as polyurethane or ethylvinylacetate, that extends throughout the length of the footwear, often by way of an injection molding process. The properties of the polymer foam material in the midsole are primarily dependent upon factors that include the dimensional configuration of the midsole and the specific characteristics of the material selected for the polymer foam, including the density of the polymer foam material. By varying these factors throughout the midsole, the relative stiffness and degree of ground reaction force attenuation may be altered to meet the specific demands of the activity for which the footwear is intended to be used. In addition to polymer foam materials, conventional midsoles may include, for example, one or more fluid-filled bladders and moderators.

It would be desirable to provide a mold assembly for a dual density midsole and a method of manufacturing a dual density midsole that reduces or overcomes some or all of the difficulties inherent in prior known devices. Particular objects and advantages will be apparent to those skilled in the art, that is, those who are knowledgeable or experienced in this field of technology, in view of the following disclosure of the invention and detailed description of certain embodiments.

SUMMARY

The principles of the invention may be used to advantage to provide a method for producing a midsole for an article of footwear having first and second portions that may have different densities. In accordance with a first aspect, a method of forming a midsole for an article of footwear includes the steps of: placing a first mold member and a second mold member in contact with one another; injecting a first material into a first recess in the first mold member to form a first portion of a midsole while the first mold member is maintained at a temperature below an ambient temperature; removing the first portion of the midsole from the first recess; positioning the first portion of the midsole in the second recess in the third mold member of the second mold assembly; placing a second material into the second recess in contact with the first portion of the midsole; placing the third mold member and the fourth mold member in contact with one another; and subjecting the second material and the first portion in the second mold assembly to heat and pressure to form a midsole In accordance with another aspect, a method of forming a midsole with a first mold assembly having a first mold member and a second mold member with a first recess formed in the first mold member, and a second mold assembly having a third mold member and a fourth mold member with a second recess formed in the third mold member, includes the steps of placing the first mold member and the second mold member in contact with one another; injecting a first material having a first density into the first recess in the first mold member to form a first portion of a midsole; removing the first portion of the midsole from the first mold member; positioning the first portion of the midsole in the second recess in the third mold member; placing pellets of a second material having a second density that is different from the first density into the second recess in contact with the first portion of the midsole; placing the third mold member and the fourth mold member in contact with one another; and subjecting the second material and the first portion in the second mold assembly to heat and pressure to form a midsole.

In accordance with a further aspect, a method of forming a midsole with a first mold assembly having a first mold member and a second mold member with a first recess formed in the first mold member, and a second mold assembly having a third mold member, an intermediate mold member, and a fourth mold member with a second recess formed in the third mold member, includes the steps of placing the first mold member and the second mold member in contact with one another; injecting a first material into the first recess in the first mold member to form a first portion of a midsole while the first mold member is maintained at a temperature below an ambient temperature; removing the first portion of the midsole from the first recess; placing the third mold member and the intermediate mold member in contact with one another; injecting a second material into the second recess in the second mold member to form a second portion of a midsole while the first mold member is maintained at a temperature below an ambient temperature; removing the intermediate mold member from the third mold member; positioning the second portion and the first portion of the midsole in contact with one another in the second recess in the third mold member of the second mold assembly; placing the third mold member and the fourth mold member in contact with one another; and subjecting the second portion and the first portion in the second mold assembly to heat and pressure to form a midsole.

Substantial advantage is achieved by providing a method of forming a midsole having two different portions. In particular, certain embodiments provide the ability to provide portions of the midsole with materials of different densities and/or hardnesses, thereby providing different performance characteristics for the different portions of the midsole These and additional features and advantages disclosed here will be further understood from the following detailed disclosure of certain embodiments.

BRIEF DESCRIPTION OF THE DRAWINGS

FIG. 7 is a perspective view of an alternative embodiment of a first mold assembly used to form a first forefoot and midfoot portion of a midsole.

FIG. 8 is a perspective view of an injection assembly connected to the first mold assembly of FIG. 7 and used to inject a first material into the first mold assembly.

FIG. 9 is a perspective view of the first forefoot and midfoot portion of a midsole that is formed using the first mold assembly of FIGS. 7-8.

Figure 2:
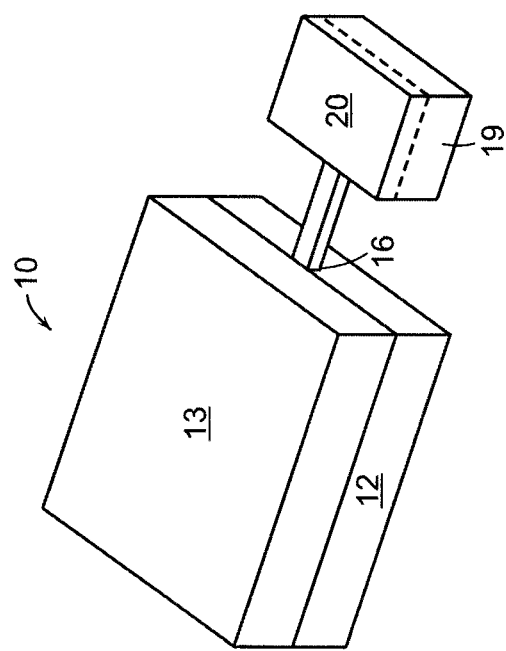
FIG. 2 is a perspective view of an injection assembly connected to the first mold assembly of FIG. 1 and used to inject a first material into the first mold assembly.

The figures referred to above are not drawn necessarily to scale, should be understood to provide a representation of particular embodiments of the invention, and are merely conceptual in nature and illustrative of the principles involved. Some features of the mold assembly for a midsole depicted in the drawings have been enlarged or distorted relative to others to facilitate explanation and understanding. The same reference numbers are used in the drawings for similar or identical components and features shown in various alternative embodiments. Mold assemblies for a midsole and methods of manufacture for such a midsole as disclosed herein would have configurations and components determined, in part, by the intended application and environment in which they are used.

DETAILED DESCRIPTION OF CERTAIN PREFERRED EMBODIMENTS

Figure 3:
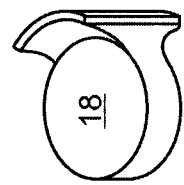
FIG. 3 is perspective view of a first portion of a midsole formed using the mold assembly of FIG. 1.
Figure 1:
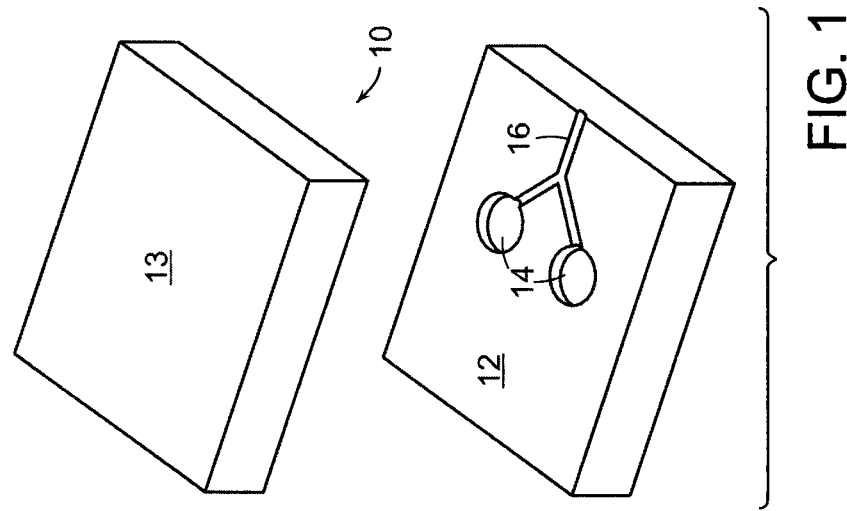
FIG. 1 is a perspective view of a first mold assembly used to form a first heel portion of a midsole.

An illustrative embodiment of a first mold assembly 10 for use in forming a first portion of a midsole for an article of footwear is shown in FIG. 1. First mold assembly 10 includes a first mold member 12 and a second mold member 13. A first recess 14 is formed in a surface of first mold member 12. A channel 16 is formed in a surface of first mold member 12 and extends from an exterior of first mold member 12 to first recess 14 such that first recess 14 is in fluid communication with an exterior of first mold member 12 by way of channel 16 when first mold member 12 and second mold member 13 are in contact with one another. First mold member 12 is configured to form a first portion 18 of a midsole, as seen in FIG. 3.

In the illustrated embodiment, there are two first recesses 14 formed in first mold member 12, one of which serves to form a first portion 18 of a left midsole of an article of footwear, and the other which serves to form a first portion 18 of a right midsole of an article of footwear. It is to be appreciated that first mold member 12 may include only one first recess 14, or more than two first recesses. That is, any number of first recesses 14 may be provided in first mold member 12, thereby providing for the simultaneous formation of any number of midsole first portions 18.

A method of forming a midsole is initiated by placing first mold member 12 and second mold member 13 in contact with one another, as seen in FIG. 2. A first material 19 is then injected into first mold assembly 10 from an injection assembly 20 by way of channel 16.

First mold assembly 10 is maintained at a temperature below ambient, in a process known as cold molding, and produces first portion 18. In certain embodiments, first mold assembly 10 maintained at a temperature between approximately 48° C. and approximately 52° C. for between approximately 40 seconds and approximately 60 seconds. In certain embodiments, first material 19 is maintained at a pressure of between approximately 80 kg and approximately 100 kg.

First mold assembly 10 is then disassembled, that is, first and second portions 12, 13 are separated from one another, and each first portion 18, as seen in FIG. 3, is removed from first mold assembly 10. In the illustrated embodiment, first portion 18 is a first heel portion 18 of a midsole. It is to be appreciated that first portion 18 can be any portion of a midsole, as illustrated and described in greater detail below.

Figure 4:
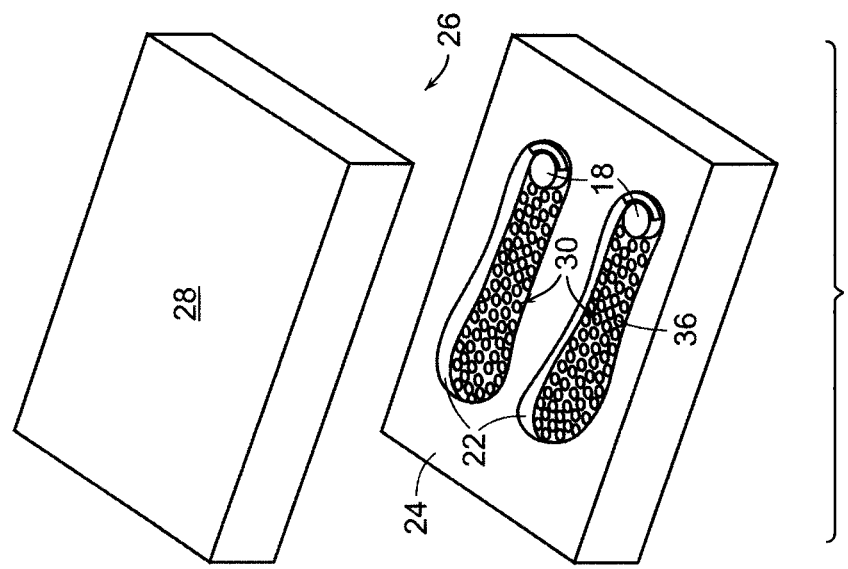
FIG. 4 is a perspective view of a second mold assembly that receives the first portion of the midsole of FIG. 3 and is used to form a midsole having two portions.

Each first heel portion 18 is then placed in a second recess 22 formed in a third mold member 24 of a second mold assembly 26, as seen in FIG. 4. Second mold assembly 26 also includes a fourth mold member 28. In the illustrated embodiment, there are two second recesses 22 formed in third mold member 24 of second mold assembly 26, one of which receives a first heel portion 18 of a left midsole of an article of footwear, and the other which receives a first heel portion 18 of a right midsole of an article of footwear. It is to be appreciated that third mold member 24 may include only one second recess 22, or more than two second recesses 22. That is, any number of second recesses 22 may be provided in third mold member 24, thereby providing for the simultaneous formation of any number of midsoles for an article of footwear.

After each first heel portion 18 is placed in a corresponding second recess 22 in third mold member 24 of second mold assembly 26, a second material 30 is placed in each second recess 22. In certain embodiments, second material 30 is formed of a plurality of pellets 36. Pellets 36 may be spherical, cylindrical, or any other desired shape. In certain embodiments pellets 36 are substantially cylindrical extruded members with a diameter of between approximately 3.4 mm and approximately 4.0 mm.

Figure 6:
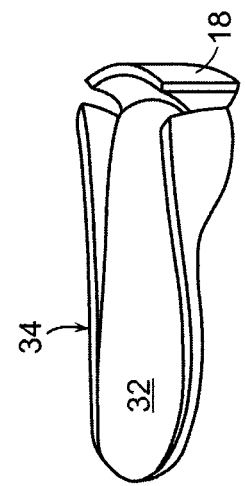
FIG. 6 is a perspective view of a midsole having two portions that is formed using the second mold assembly of FIGS. 4-5.
Figure 5:
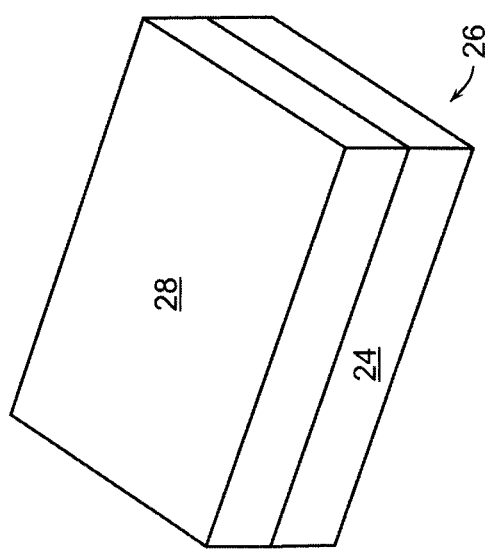
FIG. 5 is a perspective view of the second mold assembly of FIG. 4 shown in a closed condition.

After the desired number of pellets of second material 30 is placed in each second recess 22, third mold member 24 and fourth mold member 28 of second mold assembly 26 are then placed in contact with one another, as seen in FIG. 5. Second mold assembly 26 is then subjected to heat and pressure for a desired amount of time, thereby producing a second forefoot and midfoot portion 32 that is bonded to first heel portion 18, thereby forming a midsole 34, which is seen in FIG. 6 after being removed from second mold assembly 26.

In certain embodiments, second mold assembly 26 is maintained at a temperature between approximately 165° C. and approximately 169° C. for between approximately 590 seconds and approximately 610 seconds.

After removing midsole 34 from second mold assembly 26, midsole 34 may undergo typical post-curing steps including, for example, buffing, washing, and trimming.

In certain embodiments, first material 19 may have a first hardness and second material 30 may have a second hardness that is different than the first hardness. In certain embodiments, first material 19 has a first hardness between approximately 34 Asker C and approximately 36 Asker C, while second material 30 has a second hardness between approximately 39 Asker C and approximately 42 Asker C.

By providing first material 19 with a different density or hardness than second material 30, midsole 34 can be modified to achieve particular performance characteristics. Particular regions of midsole 34 can easily be engineered and constructed to have performance characteristics that are different from other regions of midsole 34.

First material 19 and second material 30 can be formed of any desired material. Suitable first and second materials include rubber, polyurethane foam, microcellular elastomeric foams, or phylon (Ethylene Vinyl Acetate ('EVA') foam). In certain embodiments, second material 30 is injection phylon. Other suitable first and second materials will become readily apparent to those skilled in the art, given the benefit of this disclosure.

Another embodiment of a first mold assembly 40 having a first mold member 42 with first recesses 44 and a channel 46, and a second mold member 43, and a method of forming a midsole having two portions, is illustrated in FIGS. 7-12. To form a midsole 41, first mold member 42 and second mold member 43 of first mold assembly 40 are placed in contact with one another, as seen in FIG. 8. First material 19 is then injected into first recesses 44 of first mold assembly 40 from injection assembly 20 by way of channel 46.

First mold assembly 40 is maintained at a temperature below ambient, in a cold molding process, and produces first portions 48 of midsole 41. In certain embodiments, first mold assembly 40 maintained at a temperature between approximately 48° C. and approximately 52° C. for between approximately 40 seconds and approximately 60 seconds. In certain embodiments, first material 19 is maintained at a pressure of between approximately 80 kg and approximately 100 kg.

First mold assembly 40 is then disassembled, that is, first and second portions 42, 43 are separated from one another, and each first portion 48, as seen in FIG. 9, is removed from first mold assembly 40. In the illustrated embodiment, first portion 48 is a first forefoot and midfoot portion 48 of midsole 41.

Figure 10:
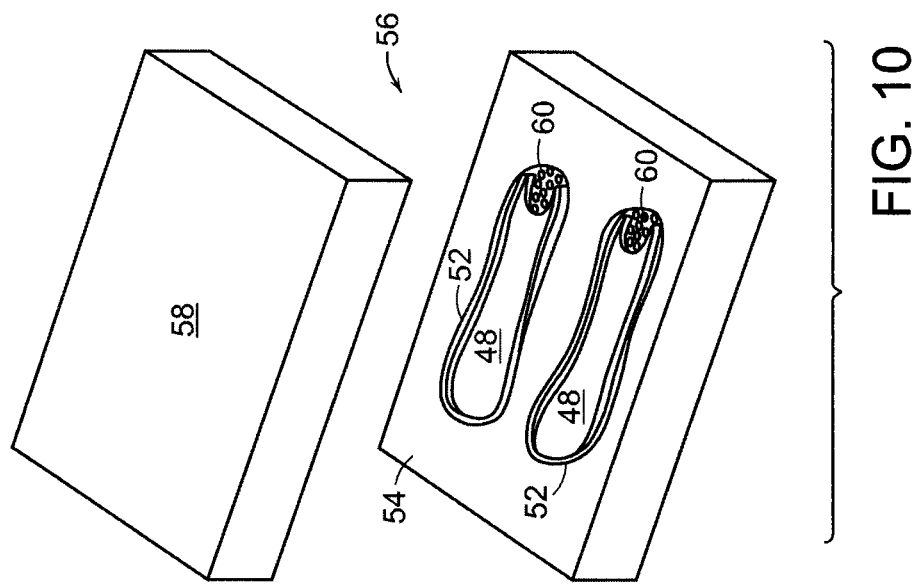
FIG. 10 is a perspective view of an alternative embodiment of a second mold assembly that receives the first portion of the midsole of FIG. 9 and is used to form a midsole having two portions.
Figure 13:
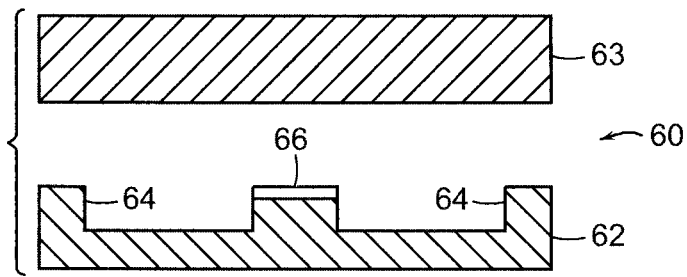
FIG. 13 is a section view of another alternative embodiment of a first mold assembly used to form a first portion of a midsole.

Each first portion 48 is then placed in a second recess 52 formed in a third mold member 54 of a second mold assembly 56, as seen in FIG. 10. Second mold assembly 56 also includes a fourth mold member 58. In the illustrated embodiment, there are two second recesses 52 formed in third mold member 54 of second mold assembly 56, one of which receives a first forefoot and midfoot portion 48 of a left midsole of an article of footwear, and the other which receives a first forefoot and midfoot portion 48 of a right midsole of an article of footwear. It is to be appreciated that third mold member 54 may include only one second recess 52, or more than two second recesses 52. That is, any number of second recesses 52 may be provided in third mold member 54, thereby providing for the simultaneous formation of any number of midsoles for an article of footwear.

After each first forefoot and midfoot portion 48 is placed in a corresponding second recess 52 in third mold member 54 of second mold assembly 56, second material 30 is placed in each second recess 52. In certain embodiments, second material 30 is placed in second recess 52 in pellet form.

Figure 12:
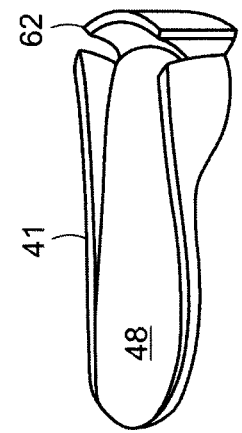
FIG. 12 is a perspective view of a midsole having two portions that is formed using the second mold assembly of FIGS. 10-11.
Figure 11:
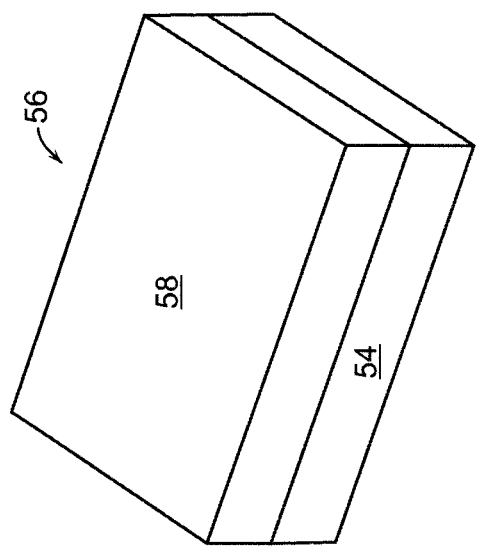
FIG. 11 is a perspective view of the second mold assembly of FIG. 10 shown in a closed condition.

After the desired number of pellets of second material 30 is placed in each second recess 52, third mold member 54 and fourth mold member 58 of second mold assembly 56 are then placed in contact with one another, as seen in FIG. 11. Second mold assembly 56 is then subjected to heat and pressure for a desired amount of time, thereby producing a second heel portion 62 that is bonded to first forefoot and midfoot portion 48, thereby forming midsole 41, which is seen in FIG. 12 after being removed from second mold assembly 56.

After removing midsole 41 from second mold assembly 56, midsole 41 may undergo typical post-curing steps including, for example, buffing, washing, and trimming.

It is to be appreciated that the first portion of a midsole formed using the first and second mold assemblies can be any portion of the midsole, and that the second portion of the midsole can be any complimentary portion of the midsole.

Yet another embodiment of a first mold assembly 60 having a first mold member 62 with first recesses 64 and a channel 66, and a second mold member 63, and a method of forming a midsole having two portions, is illustrated in FIGS. 13-18. In the illustrated embodiment, there are two first recesses 64 formed in first mold, member 62 of first mold assembly 60. It is to be appreciated that first mold member 62 may include only one first recess 64, or more than two first recesses 64. That is, any number of first recesses 64 may be provided in first mold member 62, thereby providing for the simultaneous formation of any number of midsoles for an article of footwear.

Figure 14:
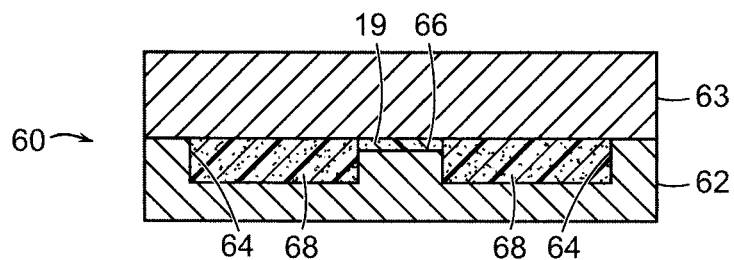
FIG. 14 is a section view of the first mold assembly of FIG. 13, shown with the first formed therein.

To form a first portion of a midsole, first mold member 62 and second mold member 63 of first mold assembly 60 are placed in contact with one another, as seen in FIG. 14. First material 19 is then injected into first mold assembly 60 by way of channel 66 from an injection assembly (not visible in this view). First mold assembly 60 is maintained at a temperature below ambient, in a cold molding process, and produces first portion 68 of a midsole. In certain embodiments, during the cold molding process, first mold assembly 60 is maintained at a temperature between approximately 48° C. and approximately 52° C. for between approximately 40 seconds and approximately 60 seconds. In certain embodiments, first material 19 is maintained at a pressure of between approximately 80 kg and approximately 100 kg.

In the embodiment illustrated in FIGS. 13-18, first portion 68 is a central portion of a midsole. It is to be appreciated that first portion 68 can be any desired portion of a midsole.

Figure 15:
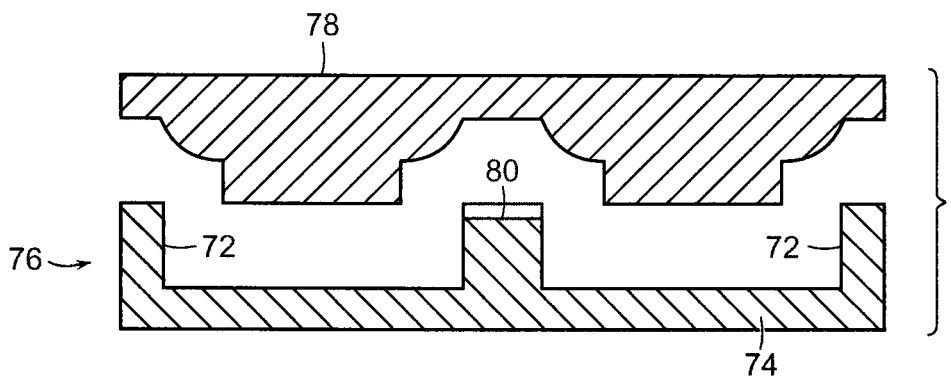
FIG. 15 is a section view of another alternative embodiment of a second mold assembly used to form a second portion of a midsole.
Figure 16:
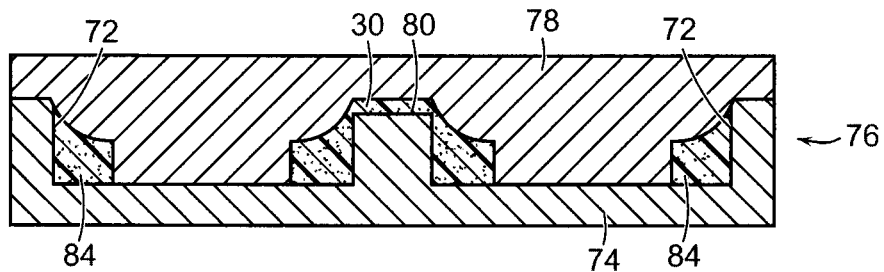
FIG. 16 is a section view of the second mold assembly of FIG. 15, shown with the second portion formed therein.

A second recess 72 in a third mold member 74 of a second mold assembly 76, seen in FIGS. 15-16, is used to form a second portion of a midsole. Second mold assembly 76 also includes an intermediate mold member 78. In the illustrated embodiment, there are two second recesses 72 formed in third mold member 74 of second mold assembly 76. It is to be appreciated that third mold member 74 may include only one second recess 72, or more than two second recesses 72. That is, any number of second recesses 72 may be provided in third mold member 74, thereby providing for the simultaneous formation of any number of midsoles for an article of footwear.

Intermediate mold member 78 is placed in contact with third mold member 74, as seen in FIG. 16. Second material 30 is then injected into second recess 72 of second mold assembly 76 by way of channel 80 from an injection assembly (not visible in this view). Second mold assembly 76 is maintained at a temperature below ambient, in a cold molding process, and produces second portion 84 of a midsole. In the illustrated embodiment, second portion 84 is a peripheral portion that surrounds the central first portion 68. It is to be appreciated that second portion 84 can be formed as any portion of the midsole.

In certain embodiments, during the cold molding process, second mold assembly 76 is maintained at a temperature between approximately 165° C. and approximately 169° C. for between approximately 590 seconds and approximately 610 seconds.

Figure 17:
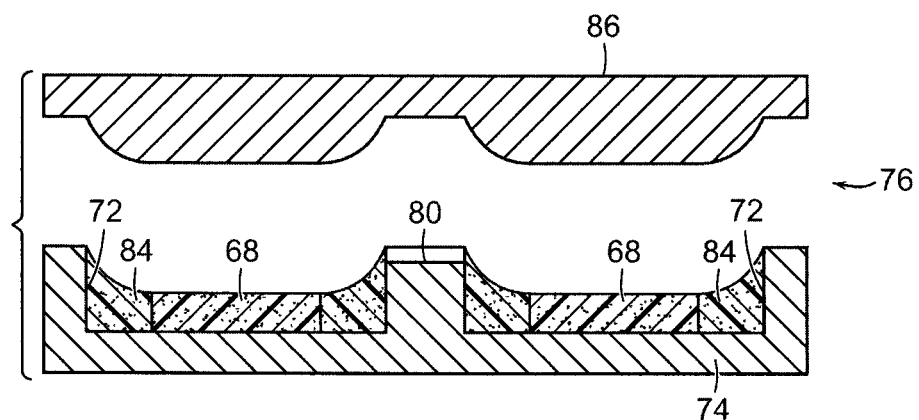
FIG. 17 is a section view of the second mold assembly of FIG. 16, shown with the first portion of the midsole of FIG. 14 being positioned adjacent the second portion of the midsole of FIG. 16.
Figure 18:
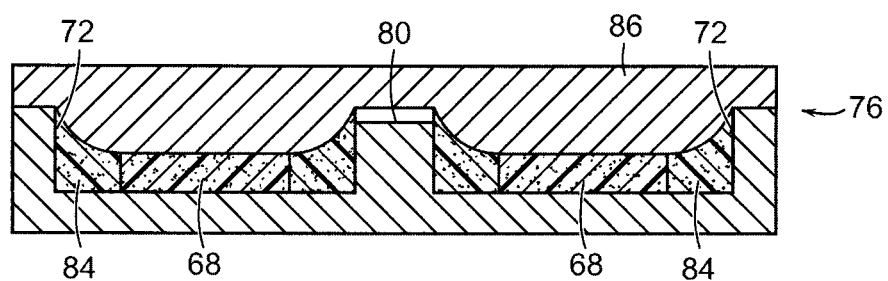
FIG. 18 is a section view of the second mold assembly of FIG. 16 with the midsole formed therein.

Intermediate mold member 78 is then separated from third mold member 74 and, as illustrated in FIGS. 17-18, first portion 68 is positioned within and in contact with second portion 84. A fourth mold member 86 of second mold assembly 76 is then placed in contact with third mold member 74. Second mold assembly 76 is then subjected to heat and pressure for a desired amount of time, thereby bonding first portion 68 and second portion 84 together to form a midsole, such as those seen in FIGS. 6 and 12 above.

Thus, while there have been shown, described, and pointed out fundamental novel features of various embodiments, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method of forming a midsole with a first mold assembly having a first mold member and a second mold member with a first recess formed in the first mold member, and a second mold assembly having a third mold member and a fourth mold member with a second recess formed in the third mold member, comprising the steps of:
   placing the first mold member and the second mold member in contact with one another;
   injecting a first material into the first recess in the first mold member to partially cure and form a first portion of a midsole while the first mold member is maintained at a temperature below an ambient temperature;
   removing the first portion of the midsole from the first recess;
   positioning a second material and the first portion of the midsole in contact with one another in the second recess in the third mold member of the second mold assembly;
   placing the third mold member and the fourth mold member in contact with one another; and
   subjecting the second material and the first portion in the second mold assembly to heat and pressure such that the first material completely cures and the first portion and the second material bond to form a midsole.

2. The method of forming a midsole of claim 1, wherein the first mold member includes at least one additional first recess, an additional first portion of a midsole being formed in each additional first recess; and
   wherein the third mold member includes at least one additional second recess, an additional midsole being formed in each additional second recess.

3. The method of forming a midsole of claim 1, wherein the first portion comprises a heel portion of a midsole.

4. The method of forming a midsole of claim 1, wherein the first portion comprises a forefoot and midfoot portion of a midsole.

5. The method of forming a midsole of claim 1, wherein the first material has a first density and the second material has a second density that is different than the first density.

6. The method of forming a midsole of claim 1, wherein the first material has a first hardness and the second material has a second hardness that is different than the first hardness.

7. The method of forming a midsole of claim 1, wherein the second material is placed in the second recess in the form of pellets.

8. The method of forming a midsole of claim 1, wherein the first mold member of the first mold assembly includes a channel, the channel extending between the first recess and an exterior of the first mold member.

9. The method of forming a midsole of claim 8, wherein the first material is injected into the first recess through the channel.

10. The method of forming a midsole of claim 1, wherein the first material is EVA.

11. The method of forming a midsole of claim 1, wherein the second material is EVA.

12. The method of forming a midsole of claim 1, wherein the second material is a second portion of a midsole.

13. The method of forming a midsole of claim 12, further comprising the step of forming the second portion of the midsole in a cold molding process.

14. A method of forming a midsole with a first mold assembly having a first mold member and a second mold member with a first recess formed in the first mold member, and a second mold assembly having a third mold member and a fourth mold member with a second recess formed in the third mold member, comprising the steps of:
   placing the first mold member and the second mold member in contact with one another;
   injecting a first material having a first density into the first recess in the first mold member to partially cure and form a first portion of a midsole while the first mold member is maintained at a temperature below an ambient temperature;
   removing the first portion of the midsole from the first mold member;
   positioning the first portion of the midsole in the second recess in the third mold member;
   placing pellets of a second material having a second density that is different from the first density into the second recess in contact with the first portion of the midsole;
   placing the third mold member and the fourth mold member in contact with one another; and
   subjecting the second material and the first portion in the second mold assembly to heat and pressure such that the first material completely cures and the first portion and the second material bond to form a midsole.

15. The method of forming a midsole of claim 14, wherein the first mold member includes at least one additional first recess, an additional first portion of a midsole being formed in each additional first recess; and wherein the third mold member includes at least one additional second recess, an additional midsole being formed in each additional second recess.

16. The method of forming a midsole of claim 14, wherein the first portion comprises a heel portion of a midsole.

17. The method of forming a midsole of claim 14, wherein the first portion comprises a forefoot and midfoot portion of a midsole.

18. The method of forming a midsole of claim 14, wherein the first mold member of the first mold assembly includes a channel, the channel extending between the first recess and an exterior of the first mold member.

19. The method of forming a midsole of claim 18, wherein the first material is injected into the first recess through the channel.

20. The method of forming a midsole of claim 14, wherein the first material is EVA.

21. The method of forming a midsole of claim 14, wherein the second material is EVA.

* * * * *